United States Patent Office 3,410,669
Patented Nov. 12, 1968

3,410,669
IMINOSULFUR OXYDIFLUORIDES AND THE PROCESS FOR THEIR PREPARATION
Richard D. Cramer, Landenberg, Pa., assignor to E. I. du Pont de Nemours and Company, Wilmington, Del., a corporation of Delaware
No Drawing. Continuation-in-part of application Ser. No. 820,115, June 15, 1959. This application May 8, 1963, Ser. No. 278,998
15 Claims. (Cl. 23—357)

This application is a continuation-in-part of my copending, coassigned application, Ser. No. 820,115, filed June 15, 1959, now abandoned.

This invention relates to new compounds containing fluorine and to a process for preparing these compounds.

Compounds containing fluorine in chemical combination have achieved considerable technical importance in recent years because of unusual properties. Thus, certain inorganic fluorides are highly reactive materials and are used as fluorinating agents or as catalysts. Other fluorine-containing compounds, especially volatile fluorine compounds having fluorine bonded to oxygen-free carbon, are inert and are used as refrigerants. Long chain compounds containing a plurality of fluorine atoms attached to carbon are generally characterized by a high degree of chemical stability and are used as lubricants or lubricant additives.

The preparation and properties of compounds with fluorine-carbon bonds have been studied extensively but less attention has been given to compounds containing a plurality of fluorine atoms attached to an atom other than carbon. Compounds containing carbon-nitrogen-sulfur bonds in which fluorine is bonded to a sulfur atom have been investigated to a very limited extent. Compounds are known which are referred to as iminosulfur difluorides (see U.S. 2,862,029) and which have the general formula R—N=SF$_2$. These products are highly reactive compounds in which the sulfur is tetravalent and is free of oxygen, i.e., the sulfur is not bonded to oxygen. Compounds in which the sulfur is hexavalent and is bonded to an oxygen atom, a nitrogen atom and to two fluorine atoms are unknown.

The new class of compounds of the invention can be described generically as "iminosulfur oxydifluorides". This class of compounds has a characteristic feature a group which contains a hexavalent sulfur atom which is joined to an oxygen atom by a double bond, to a trivalent nitrogen atom by a double bond and to each of two fluorine atoms by single bonds. The characterizing group in these compounds is represented by the formula $$-N=S\overset{O}{\underset{F}{\overset{\|}{-}}}F \quad \text{or} \quad -N=S(O)F_2$$

The new compounds of the invention are represented by the general formula $$X-N=S\overset{O}{\underset{F}{\overset{\|}{-}}}F$$

wherein X is hydrogen or an organic group. When X is hydrogen the compound has the formula $$HN=S\overset{O}{\underset{F}{\overset{\|}{-}}}F$$

i.e., it is iminosulfur oxydifluoride, the first and simplest compound of the broad class of the compounds of the invention. When X is an organic group (R), the compounds of the invention can be represented by the formula $$R-N=S\overset{O}{\underset{F}{\overset{\|}{-}}}F$$

The composition of the R group is not critical and it is determined primarily by the availability of the amines from which the iminosulfur oxydifluorides are obtained. Thus, R preferably is an organic group of 1–18 carbons which is a hydrocarbon, a halohydrocarbon in which the halogens are of atomic number 9–35 (fluorine, chlorine and bromine), or a substituted hydrocarbon in which the only substituents are at most two (i.e., 1–2) of the following groups: iminosulfur oxydifluoride [—N=S(O)F$_2$], carboxyl [—C(O)OH], nitro (—NO$_2$), amino (—NH$_2$), loweralkylamino [—NH(loweralkyl), —N(loweralkyl)$_2$], and hydroxyl (—OH), each amino, loweralkylamino and hydroxyl group being bonded to a nuclear carbon of an aromatic ring. The expression "loweralkyl" as used herein denotes an alkyl group of less than eight carbons. It is also preferred that the above hydrocarbon, halohydrocarbon or substituted hydrocarbon groups contain at most one olefinic or acetylenic bond, i.e., at most one aliphatic >C=C< or —C≡C— linkage. Compounds of the invention wherein R is an aliphatically saturated hydrocarbon, halohydrocarbon or substituted hydrocarbon group as described above are particularly preferred. By aliphatically saturated I means that the group is free of olefinic and acetylenic bonds and that it can contain aromatic unsaturation.

The preferred compositions of the R group, as described above, are based solely on cost and availability of the amine reactant. Thus, the total number of carbons in R is not critical but a maximum of 18 carbons is preferred because amines of this carbon content are generally available. The R group can be open chain, closed chain (i.e., cyclic) or a combination of open and closed chains. The open chain structure can be a straight or branched chain.

A class of especially preferred iminosulfur oxydifluorides are compounds in which R contains at most 18 carbons and is an aliphatically saturated hydrocarbon group (alkyl, cycloalkyl, aryl, alkaryl) or a substituted aliphatically saturated hydrocarbon group in which the alpha-carbon, i.e., the carbon bonded to —N=S(O)F$_2$, is unsubstituted [—CH$_2$N=S(O)F$_2$], the substituents on said R group being halogen of atomic number 9–35, or up to two groups which are iminosulfur oxydifluoride, carboxy, nitro, amino or hydroxyl, each amino or hydroxyl group being bonded to a nuclear carbon of an aromatic ring.

The following examples are illustrative of the broad range of the compounds of the invention:

methyliminosulfur oxydifluoride,
neopentyliminosulfur oxydifluoride,
octyliminosulfur oxydifluoride,
2-ethylhexyliminosulfur oxydifluoride,
cyclobutyliminosulfur oxydifluoride,
cyclohexyliminosulfur oxydifluoride,
4-cyclohexylphenyliminosulfur oxydifluoride,
4-cyclopentylphenyliminosulfur oxydifluoride,
4-phenylcyclohexyliminosulfur oxydifluoride,
2-decahydronaphthyliminosulfur oxydifluoride,
2-anthryliminosulfur oxydifluoride,
4-biphenyliminosulfur oxydifluoride,
5-acenaphtheniminosulfur oxydifluoride,
2-fluoreniminosulfur oxydifluoride,
methallyliminosulfur oxydifluoride,
crotyliminosulfur oxydifluoride, octadecenyliminosulfur oxydifluoride,
octynyliminosulfur oxydifluoride,
butynyliminosulfur oxydifluoride,
2-chloroethyliminosulfur oxydifluoride,
2,2,2-trifluoroethyliminosulfur oxydifluoride,
1H,1H,5H-octafluoropentyliminosulfur oxydifluoride,
3-bromopropyliminosulfur oxydifluoride,
8,8,8-trifluorooctyliminosulfur oxydifluoride,
4-carboxycyclohexyliminosulfur oxydifluoride,
1H,1H-perfluorohexyliminosulfur oxydifluoride,
4-nitrocyclohexyliminosulfur oxydifluoride,
p-fluorophenyliminosulfur oxydifluoride,
2,4-dichlorophenyliminosulfur oxydifluoride,
p-diethylaminophenyliminosulfur oxydifluoride,
m-dihexylaminophenyliminosulfur oxydifluoride,
p-methylaminophenyliminosulfur oxydifluoride,
p-dimethylaminophenyliminosulfur oxydifluoride,
p-nitrophenyliminosulfur oxydifluoride,
4-(3'-nitrophenyl)-phenyliminosulfur oxydifluoride,
4-(4'-nitrocyclohexyl)-phenyliminosulfur oxydifluoride,
3,3-dichloro-4,4,4-trifluorobutyliminosulfur oxydifluoride,
3-carboxy-2-hydroxyphenyliminosulfur oxydifluoride,
5-nitro-3-hydroxyphenyliminosulfur oxydifluoride,
4-carboxy-8-bromonaphthyliminosulfur oxydifluoride,
and the like.

The compounds of the invention in which the nitrogen is bonded to an organic group are colorless liquids or solids which have a generally pleasant odor. These compounds are free of the acrid odor normally found in acid halides. However, the unsubstituted iminosulfur oxydifluoride, i.e., $HN=S(O)F_2$, has a fairly sharp odor. The compounds are stable chemically and are not readily hydrolyzed by water. They are insoluble in water but dissolve readily in the conventional organic solvents, e.g., acetone, benzene, ether, ethyl acetate, dimethylformamide, acetonitrile, and the like. The compounds hydrolyze only very slowly in contact with aqueous alkaline solution but will hydrolyze more rapidly in a solvent for both the iminosulfur oxydifluoride and the alkaline reagent. The excellent chemical stability of the iminosulfur oxydifluorides of the invention is in marked contrast to the high chemical reactivity disclosed in U.S. 2,862,029 for iminosulfur difluorides. The compounds of the invention can be stored in conventional containers under ordinary conditions of temperature and humidity. It is not necessary to take precautions to prevent access of moisture. The iminosulfur oxydifluorides are relatively stable thermally.

The iminosulfur oxydifluorides are prepared by reacting thionyl tetrafluoride ($SOF_4$) with ammonia or a primary amine. It is not essential, however, that ammonia or the primary amines be used as the free bases. These reactants can be used, if desired, in the form of their salts with organic and inorganic acids. For simplicity of presentation, the nitrogen-bearing reactant will be referred to as ammonia or an organic amine but it is intended to include within the scope of these terms the free bases and their salts.

The process can also be described as the reaction of thionyl tetrafluoride with a compound of the formula $XNH_2$ (or its salts) where X is hydrogen or an organic radical, R, bonded to the nitrogen through a carbon atom. The mechanism of the reaction is not clearly understood but it can be represented by the following equation:

$$-NH_2 + SOF_4 \rightarrow N=S(O)F_2 + 2HF$$

The reaction may, if desired, be conducted in the presence of a hydrogen fluoride acceptor, for example, an alkali metal fluoride such as sodium fluoride, whereby the concentration of free hydrogen fluoride is kept at a minimum during the operation of the process.

Thionyl tetrafluoride, also called sulfur oxytetrafluoride, which is employed as one reactant, is a gas boiling at —49° C. It can be prepared by fluorination of thionyl fluoride, as described by Dudley, Cady and Eggers, J. Am. Chem. Soc., 78, 1553 (1956). Material which has been purified by conventional methods is satisfactory for use.

The nitrogen-bearing reactant, i.e., ammonia, organic amines or their salts, are commercially available materials which can be employed in the process without special purification. It is preferred that the reactants be substantially anhydrous but it is not essential that all traces of water be removed. The presence of minor amounts of water will not render the process inoperable.

The conditions which are used in the process are determined to some extent by the nature of the iminosulfur oxydifluoride which is being prepared. Preparation of the simplest iminosulfur oxydifluoride, i.e., $HN=S(O)F_2$, requires more careful control of conditions, particularly with respect to temperature, than the preparation of nitrogen-substituted iminosulfur oxydifluorides, i.e., compounds of the structure $RN=S(O)F_2$. The conditions for preparing both types of compounds are discussed more fully in the following paragraphs.

The simplest compound of the invention, i.e., iminosulfur oxydifluoride, is prepared by reacting ammonia (or an ammonium salt of an organic or inorganic acid) and thionyl tetrafluoride at a low temperature, preferably at about the melting point of carbon dioxide in the presence of a neutral (i.e., neither acidic nor basic) oxygenated liquid reaction medium in which the oxygen is present as an oxy linkage. A reaction temperature of less than —50° C. is especially preferred to obtain maximum yield of the desired product. When the reaction is conducted at temperatures higher than about —30° C., whether in the presence or absence of an oxygenated liquid reaction medium, the principal product is a polymer and no measureable quantity of iminosulfur oxydifluoride, i.e., $HN=S(O)F_2$, is obtained. The reaction can be represented by the following equation:

$$NH_3 + SOF_4 \rightarrow HN=S(O)F_2 + 2HF$$

The preferred reaction medium for the reaction of ammonia (or its salts) and thionyl tetrafluoride is an organic ether in which the ether oxygen is bonded to hydrocarbon groups of at least two carbons each. Especially preferred are hydrocarbon ethers in which the hydrocarbon groups are saturated and have from 2–6 carbons. Cyclic ethers can be employed although open chain ethers are preferred. Examples of operable ethers are diethyl ether, diisopropyl ether, ethyl butyl ether, dicyclopropyl ether, dicyclohexyl ether, tetrahydrofuran and dioxane.

The order in which the reactants are added in the process is not critical. The ammonia and thionyl tetrafluoride may be added separately in any order to the reaction medium or the reactants can be added simultaneously. In one mode of operation of the process, the desired quantity of liquid ammonia is dissolved in the ether solvent at a low temperature, e.g., —50° to —80° C., and thionyl tetrafluoride is added gradually to the stirred ammonia-ether solution. Reaction is rapid and reaches completion in a relatively short time. The reaction mixture is worked up by conventional methods, e.g., filtration and distillation, and iminosulfur oxydifluoride is obtained most conveniently as an azeotrope with ether which boils at 57–58° C. The molar ratio of ethyl ether to iminosulfur oxydifluoride in the azeotrope is about 0.85:1. Iminosulfur oxydifluoride can be obtained in pure form from the azeotrope by a number of methods, e.g., by vapor phase chromatography or by forming a complex of the ether with boron trifluoride and separating the iminosulfur oxydifluoride by distillation. Pure iminosulfur oxydifluoride is a colorless liquid boiling at 43–44° C.

The nitrogen-substituted compounds of the invention, i.e., compounds of the formula $R-N=S(O)F_2$, where R has the meaning described previously, are obtained by the reaction of primary amines (or their salts with organic and inorganic acids) with thionyl tetrafluoride. The discussion which follows applies to the process employing a primary amine (in contrast to ammonia, discussed earlier) and thionyl tetrafluoride.

The primary amines suitable for reaction with thionyl tetrafluoride according to the process of this invention are of the formula R'NH₂, where R' is a monovalent organic group. It is preferred, of course, that the organic group be free of substituents, other than —NH₂, which may react with thionyl tetrafluoride or the iminosulfur oxydifluoride group under the conditions of the process and thus lead to a substantial reduction in the yield of desired iminosulfur oxydifluoride. To illustrate, R' should be free of aliphatically bonded hydroxyl and lower-alkylamino groups. By the term "aliphatically-bonded" I means the substituents are bonded to carbons which are members of aliphatic and cycloaliphatic groups. Compounds which are free of the aliphatically-bonded substituents named above are readily prepared and easily purified. Compounds having hydroxyl and loweralkylamino groups bonded to nuclear carbons of aromatic groups are operable and are included in the invention.

In the preferred primary amines, represented by the formula R'NH₂, R' is an organic group of 1–18 carbons which is a hydrocarbon, a halohydrocarbon in which the halogens are of atomic number 9–35 (fluorine, chlorine and bromine), or a substituted hydrocarbon in which the only substituents, in addition to the —NH₂ group already present, are at most two (i.e., 1–2), of the following groups: carboxyl, nitro, amino, mono- and di(loweralkyl)amino and hydroxyl, each mono- and di(loweralkyl)amino and hydroxyl group being bonded to nuclear carbon of an aromatic ring. When R' is thus defined, the reaction can be represented by the following equation:

$$R'NH_2 + SOF_4 \rightarrow R-N=(O)F_2 + 2HF$$

where R is as previously defined. As is by now apparent, R and R' will be identical unless R' contains primary amine groups which react with thionyl tetrafluoride.

As in the case of R, it is preferred that R' contain at most one olefinic or acetylenic bond, with aliphatically saturated R' groups being particularly preferred.

An especially preferred class of primary amine reactants are those in which R' contains at most 18 carbons and is an aliphatically saturated hydrocarbon group or substituted aliphatically saturated hydrocarbon group in which alpha-carbon, i.e., the carbon bonded to —NH₂, is unsubstituted [—CH₂NH₂], the substituents on said R' group being halogen of atomic number 9–35 or 1 to 2 members of the group consisting of amino, carboxy, nitro and hydroxy, each hydroxy group being bonded to a nuclear carbon of an aromatic ring.

The primary amine reactant can, of course, have more than one primary amine group, e.g., two, three or even a greater number of —NH₂ substituents can be present. In the case of aliphatic compounnds which have a plurality of —NH₂ substituents, all of the primary amine substituents generally react with thionyl tetrafluoride to obtain a compound which has a plurality of iminosulfur oxydifluoride groups. In the case of aromatic amines having two or more primary amine substituents, products are obtained in which one or more than one of the primary amine substituents have reacted with thionyl tetrafluoride. It is possible, therefore, to prepare aromatic iminosulfur oxydifluorides having a primary amine substituent bonded to a nuclear carbon. In general, substituents (other than primary amine) bonded to carbons of an aromatic ring do not enter into the reaction with thionyl tetrafluoride. Secondary and tertiary amine groups, e.g., C₂H₅NH— and (C₂H₅)₂N—, bonded to nuclear aromatic carbon do not enter into the reaction, and these groups appear in the final product.

It is not essential that a solvent be employed in the reaction of a primary amine with thionyl tetrafluoride. Solvents can, of course, be employed as a matter of convenience to facilitate handling of the reactants and to control the temperature or the rate of the reaction. Solvents, if used, should be inert or non-reactive with any of the components present in the process. Examples of suitable solvents are ether, benzene, acetonitrile and acetone.

The temperature at which the primary amine (R'NH₂) and thionyl tetrafluoride are reacted is not critical. In general, the temperature is kept as low as possible and it should not exceed the disproportionation temperature of thionyl tetrafluoride which is about 450° C. The temperature may lie between about —80° C. and about 250° C. Satisfactory yields of iminosulfur oxydifluorides are usually obtained at a temperature lying between about —20° and 150° C.

The molar ratio in which the reactants (either ammonia or amine and SOF₄) are employed is not critical and operable molar ratios may cover a wide range, for example, the ratio, expressed as moles of NH₂ groups/moles of SOF₄, may lie between about 0.05 and about 20. For maximum yields of iminosulfur oxydifluorides, the preferred molar ratios will be dependent to some extent on the nature and reactivity of the amine reactant. Thus, when an aliphatic amine is employed as a reactant, it is preferred that the molar ratio, NH₂ groups/SOF₄ should be no greater than about 4. When a higher molar ratio of aliphatic amine to SOF₄ is employed, iminosulfur oxydifluorides are obtained but in reduced yield and the reaction requires more careful control than when a lower molar ratio of reactants is employed. When an aromatic amine is used as a reactant the maximum molar ratio, NH₂ groups/SOF₄, can be high without adverse effect on the yield of iminosulfur oxydifluoride. In general, satisfactory yields of the desired product are obtained by employing a molar ratio which lies between about 0.5 and 4.0.

The process is generally conducted in reaction vessels from which moist air is preferably excluded by conventional means. The inner surface of the reaction chamber is preferably made of corrosion-resistant material, e.g., glass or a nickel-iron-molybdenum alloy known commercially as "Hastelloy" C. Rigorous exclusion of moisture is not essential, and, in fact, the process will operate in the presence of moist air although the yield of desired product may be reduced.

The pressure under which the reaction is conducted is not critical. When the process is conducted under pressure, the reaction vessel is generally chilled to a low temperature, e.g., in a solid carbon dioxide/acetone bath, and is then flushed with nitrogen. The reaction vessel is charged with the nitrogen-containing reactant and with thionyl tetraflouride. The reaction vessel is closed and heated under autogenous pressure with suitable mechanical agitation at a temperature and for a period of time necessary to effect reaction. The reaction generally proceeds rapidly and is completed in a relatively short time.

When the process is conducted at atmospheric pressure, the reaction vessel is equipped with tubes containing drying agents to exclude excessively moist air and with one or more condensers to prevent escape of low boiling materials, e.g., thionyl tetrafluoride. The reactor is generally cooled to a low temperature and is charged with a solvent and then nitrogen-bearing reactant. Thionyl tetrafluoride is then led into the reaction chamber through an inlet tube which terminates above the surface of the reaction mixture. The reaction mixture is preferably stirred vigorously during the process.

In either mode of operation the reaction mixture is generally filtered at the end of the operation, and the filtrate is washed with water and alkaline solution to remove acidic by-products. The solvent, if present, is removed by distillation, and the residue is fractionally distilled under reduced pressure to obtain the pure product. Other conventional and well known methods of purification can be employed, e.g., distillation in a molecular still, vapor phase and liquid phase chromatography and fractional crystallization at low temperatures.

The invention is illustrated in greater detail in the following examples, in which parts are by weight unless otherwise indicated.

EXAMPLE I (A)

A glass reaction vessel (capacity, 1000 parts of water), fitted with a mechanical stirrer, thermometer and gas inlet tube, is cooled to about −80° C. and is charged with about 175 parts of ether and 1.7 parts of liquid ammonia. The solution is stirred and maintained at −55° C. and 12.4 parts of thionyl tetrafluoride is passed into the vessel over a period of 15 minutes. A thick white solid forms which partially redissolves as the reaction proceeds. The mixture is allowed to warm to about 25° C. in a 3-hour period, and the supernatant liquid is decanted. This liquid is distilled through an efficient fractionating column, and there is obtained about 4.7 parts of a liquid boiling at 55–58° C. Redistillation of the liquid product yields 3.7 parts of a clear liquid, boiling at 57.5° C. The nuclear magnetic resonance spectra for proton and for fluorine and elementary analyses show that the product is a constant boiling azeotrope of iminosulfur oxydifluoride, $(HN{=}S(O)F_2)$ and ether. The elemental analysis of this product is as follows: C, 25.56; H, 6.00; N, 8.82; S, 19.43; F, 22.17.

(B)

Ammonia and thionyl tetrafluoride are passed separately into about 210 parts of ether at −30 to −40° C. for 25 minutes. The ammonia is passed in at a rate of 0.2 part by volume/minute and thionyl tetrafluoride at a rate of about 0.09 part by volume/minute. The mixture is allowed to warm to about 25° C. and is then filtered. The filtrate is fractionally distilled to yield 4.7 parts of the azeotrope of iminosulfur oxydifluoride and ether, boiling at 57.5° C.; $n_D^{25}$, 1.3395. The elemental analysis on this product is as folows: C, 25.28; H, 6.25; F, 24.30; N, 9.40; S, 19.66.

The analyses of the products obtained in Part A and Part B show that the ratio of ether to iminosulfur oxydifluoride in the liquid product is approximately 0.84± 0.03, i.e., approximately 0.85 mole of ether is present for each mole of iminosulfur oxydifluoride and the approximate formula of the liquid product is $HN{=}S(O)F_2 \cdot 0.85 C_2H_5OC_2H_5$.

(C)

A glass polymer tube (capacity, 25 parts of water) is charged with 5.5 parts of the azeotrope obtained as described in Part A, and an equimolar quantity of boron trifluoride is condensed in the tube. The tube is sealed and stored for 16 hours at −78° C. It is then opened, and the contents, chilled to −78° C., are fractionally distilled at 0.04 mm. pressure. No distillate is obtained at −78° C. but on gradual warming about 0.3 part of colorless liquid is obtained at −33° C. and, at 0° C., 3–4 parts of colorless liquid are collected in the receiver. Redistillation of this fraction at atmospheric pressure yields 1.7 parts of iminosulfur oxydifluoride, a stable colorless liquid of sharp odor, boiling at 44° C., $n_D^{25}$, 1.3223; $d_{25}=1.5246$. The identity of the compound is confirmed by nuclear magnetic resonance and infrared absorption spectra and by elemental analysis.

*Analysis.*—Calc'd for $HNS(O)F_2$: N, 13.86; S, 31.72; F, 37.59. Found: N, 14.46; S, 32.45; F, 37.96.

EXAMPLE II

A glass reactor of the type described in Example I is charged with 3.7 parts of ammonium fluoride, 12 parts of sodium fluoride and about 110 parts of diethyl ether. The mixture is chilled to −78° C. and approximately 12.5 parts of thionyl tetrafluoride is passed into the reactor with vigorous stirring of the reaction mixture over a period of 20 minutes. The reaction mixture is allowed to warm to about 25° C. over a period of 15–18 hours and it is then filtered. The filtrate is distilled through an efficient fractionating column to obtain 3.1 parts of the iminosulfur oxydifluoride-ether azeotrope boiling at 57–57.5° C. The iminosulfur oxydifluoride is separated from the azeotrope by the process described in Example I, Part C. The pure compound is also separated by vapor phase chromatography employing a heat stable silicone (B.P. 185° C.) on firebrick.

By employing the process described in Example II, thionyl tetrafluoride can be reacted with ammonium salts of organic and inorganic acids to obtain iminosulfur oxydifluoride. Examples of salts which can be employed are ammonium chloride, ammonium nitrate, ammonium sulfate, ammonium phosphate, ammonium acetate, ammonium butyrate, ammonuim benzoate, and the like. The preferred salts are the readily available commercial products such as ammonuim chloride.

EXAMPLE III

A pressure reaction vessel (capacity, 400 parts of water) lined with "Hastelloy" C is flushed with nitrogen gas and cooled in a solid carbon dioxide/acetone solution. The vessel is then charged with 8 parts of methylamine and 31 parts of thionyl tetrafluoride. The charged vessel is sealed, and it is then heated to 95–104° C. for 16 hours. The reaction vessel, cooled to about 25° C., is connected to an evacuated stainless steel cylinder which is chilled in a solid carbon dioxide/acetone bath, and the low boiling reaction products are distilled into the stainless steel cylinder. There is obtained 27.5 parts of reaction products.

The above reaction is repeated employing 16 parts of methylamine and 31 parts of thionyl tetrafluoride, and there is obtained 13.2 parts of reaction products.

The reaction products of the two runs are combined, and they are distilled in a fractional distillation apparatus over sodium fluoride. A volatile material, boiling at −39° C. is removed initially after which there is obtained 14 parts of methyliminosulfur oxydifluoride boiling at 39° C. The structure of the compound, which is $CH_3N{=}S(O)F_2$, is confirmed by the infrared and nuclear magnetic resonance spectra, by the mass spectrum and by elemental analysis.

*Analysis.*—Calc'd for $CH_3NSOF_2$: C, 10.8; H, 2.61; N, 12.2; S, 27.9; F, 33.0. Found: C, 10.22; H, 2.53; N, 11.18; S, 27.55; F, 32.61.

EXAMPLE IV

In this procedure there is employed a glass reaction vessel (capacity, 1000 parts of water) which is equipped with a condenser cooled with a solid carbon dioxide/acetone solution, a dropping funnel and a mechanically driven stirrer. The reaction vessel is chilled in a solid carbon dioxide/acetone bath, and the vessel is charged with approximately 36 parts of ether and 31 parts of thionyl tetrafluoride. To this chilled solution there is added over a period of 1 hour with vigorous stirring a solution of 7.5 parts of ethylenediamine in about 40 parts of ethyl ether. A white solid separates from the mixture during the reaction. After addition of the diamine solution is completed, the reaction vessel is warmed to 10° C. for 4 hours and then allowed to stand for 15 hours at 25° C. The reaction mixture is poured onto chopped ice, and the etheral solution is separated. This solution is washed successively with aqueous dilute alkali solution, dilute hydrochloride acid solution and water. The etheral solution is dried over anhydrous magnesium sulfate, filtered and the ether is removed by evaporation. The liquid residue is distilled in an efficient fractionating unit to obtain 6 parts of ethylenebis(iminosulfur oxydifluoride), boiling at 52° C./11 mm. The identity of the compound, which has the formula

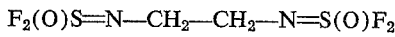
$$F_2(O)S=N-CH_2-CH_2-N=S(O)F_2$$

is confirmed by the infrared spectrum and by elemental analysis.

*Analysis.*—Calc'd for $C_2H_4N_2O_2S_2F_4$: C, 12.3; H, 1.75; N, 12.4. Found: C, 11.47; H, 1.96; N, 11.37.

Examples III and IV illustrate the compounds of the invention in which the R group is aliphatic hydrocarbon, and their preparation The process is generic for the preparation of this class of compounds and can be employed with aliphatic open and closed chain primary amines bearing at least one —NH₂ group. The R group can be alkyl, alkenyl, alkynyl, cycloalkyl, cycloalkenyl or a combination of these structures. To illustrate, by employing the process of Examples III and IV, thionyl tetrafluoride can be reacted with ethylamine to obtain ethyliminosulfur oxydifluoride, with 2-ethylhexylamine to obtain 2-ethylhexyliminosulfur oxydifluoride, with dodecylamine to obtain dodecylimino-sulfur oxydifluoride, with octadecylamine to obtain octadecyliminosulfur oxydifluoride, with allylamine to obtain allyliminosulfur oxydifluoride, with methallylamine to obtain methallyliminosulfur oxydifluoride, with octenylamine to obtain octenyliminosulfur oxydifluoride, with 2-propynylamine to obtain propynyliminosulfur oxydifluoride, with butynylamine to obtain butynyliminosulfur oxydifluoride, with cyclohexylamine to obtain cyclohexyliminosulfur oxydifluoride, with 4-allylcyclohexylamine to obtain 4-allylcyclohexyliminosulfur oxydifluoride, with 1,3-diaminopropane to obtain 1,3 - propylenebis(iminosulfur oxydifluoride), with 1,6 - diaminohexane to obtain 1,6-hexamethylenebis(iminosulfur oxydifluoride), with 1,4-diaminocyclohexane to obtain 1,4-cyclohexylbis(iminosulfur oxydifluoride), with 1,3,5-triaminocyclohexane to obtain 1,3,5-cyclohexyltris(iminosulfur oxydifluoride) and with cyclohexenylamine to obtain cyclohexenyliminosulfur oxydifluoride.

EXAMPLE V

A reaction vessel, similar to the reactor described in Example IV, is charged with 33 parts of ξ-aminocaproic acid and about 78 parts of acetonitrile. The suspension of the acid in acetonitrile is stirred vigorously at about 25° C., and there is added 31 parts of thionyl tetrafluoride over a period of about 0.75 hour. The reaction mixture becomes warm initially, but it later becomes cool. The aminocaproic acid dissolves as the reaction proceeds. The reaction mixture is poured into ice water, ether is added, and the ether-acetonitrile solution is separated. This solution is washed with water, 100 parts of water is added, and 20 M sodium hydroxide solution is carefully added with stirring until the solution becomes alkaline. The aqueous solution is separated, filtered and concentrated to a small volume under reduced pressure. The concentrated solution is acidified carefully with dilute hydrochloric acid, and there is obtained 6.5 parts of 5-carboxy-n-pentyl-iminosulfur oxydifluoride, an oil which solidifies when chilled and melts at about 0° C. The compound is purified by vacuum sublimation (bath temperature, 50° C.; pressure, 2 mm.) into a condenser chilled with a solid carbon dioxide/acetone solution. The purified product is a colorless oil at room temperature; neutral equivalent: calculated, 215; found, 215. The identity of the compound which has the structure

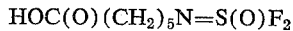
$$HOC(O)(CH_2)_5N=S(O)F_2$$

is confirmed by the infrared absorption spectrum.

Example V illustrates the compounds of the invention, and their preparation, in which the R group is a substituted aliphatic hydrocarbon bearing substituents which are inert to or unreactive with the iminosulfur oxidifluoride group. Such substituents are, of course, unreactive with thionyl tetrafluoride. The process is generic for the preparation of this class of compounds and can be employed with aliphatic open and closed chain primary amines bearing inert substituents. The R groups can be substituted alkyl, alkenyl, alkynyl, cycloalkyl, cycloalkenyl or a combination of these structures in which the substituents are halogens of atomic number 9–35, carboxyl and nitro groups as well as iminosulfur oxydifluoride groups. The primary aliphatic amines employed in the process can have as substitutents, in addition to primary amine groups, halogens of atomic number 9–35, carboxyl and nitro groups. To illustrate, thionyl tetrafluoride can be reacted with fluoropropylamine to obtain fluoropropyliminosulfur oxydifluoride, with trifluoromethylcyclohexylamine to obtain trifluoromethylcyclohexyliminosulfur oxydifluoride, with bromocyclohexylamine to obtain bromocyclohexyliminosulfur oxydifluoride, with bromocyclohexylmethylamine to obtain bromocyclohexylmethyliminosulfur oxydifluoride, with nitrohexylamine to obtain nitrohexyliminosulfur oxydifluoride, with dinitrocyclohexylamine to obtain dinitrocyclohexyliminosulfur oxydifluoride, with allylchlorocyclohexylamine to obtain allylchlorocyclohexyliminosulfur oxydifluoride, with 3-carboxypropylamine to obtain 3-carboxypropylimino-sulfur oxydifluoride, with glycine to obtain carboxymethyliminosulfur oxydifluoride, with carboxydecahydronaphthylamine to obtain carboxydecahydronaphthyliminosulfur oxydifluoride and with β-(di-carboxy)ethylamine to obtain β-(di-carboxy)ethyliminosulfur oxydifluoride.

EXAMPLE VI (A)

A pressure reaction vessel, similar to the reactor employed in Example III, is charged with 46.5 parts of aniline. The vessel is closed, chilled in a solid carbon dioxide/acetone solution and evacuated to a low pressure. The vessel is then charged with 31 parts of thionyl tetrafluoride, and the reaction mixture is heated at 100° C. for 16 hours. After cooling to about 25° C. the vessel is opened, and the liquid reaction product is transferred to an efficient fractional distillation unit. The product is distilled under reduced pressure and yields 16 parts of phenyliminosulfur oxydifluoride, a colorless liquid which boils at 62° C./26 mm.; $n_D^{25}$, 1.4751. The identity of the compound, which has the structure $C_6H_5N=S(O)F_2$, is confirmed by the infrared absorption spectrum.

(B)

A glass reaction vessel (capacity, 500 parts of water) equipped as described in Example II, is chilled in a solid carbon dioxide/acetone bath and charged with 31 parts of thionyl tetrafluoride and about 71 parts of ethyl ether. Aniline (46 parts) is added through the dropping funnel at a controlled rate. The reaction is vigorous initially and refluxing occurs. About one-half the aniline is added over a 30-minute period, and the remainder is added over a 10-minute period when the vigor of the reaction is subsiding. The reaction mixture is poured onto chopped ice, and the ethereal solution is separated. The solution is washed successively with cold aqueous hydrochloric acid and water, and it is then dried over anhydrous magnesium sulfate. The ether solution is filtered, the ether removed by evaporation, and the liquid residue is distilled to obtain 35 parts of phenyliminosulfur oxydifluoride.

Phenyliminosulfur oxydifluoride is a chemically stable compound which can be chlorinated by conventional procedures to yield p-chlorophenyliminosulfur oxydifluoride, a colorless liquid, boiling at 95–98° C./35 mm.; $n_D^{25}$, 1,0532. The identity of the chlorophenyl compound is confirmed by its infrared absorption spectrum.

EXAMPLE VII (A)

Using a pressure vessel and procedure as described in Example III, a mixture of 13.5 parts of p-phenylenediamine and 31 parts of thionyl tetrafluoride is heated at 75° C. for 15.5 hours. There is obtained a fuming reaction product which is a heavy black tar with some black mobile liquid. The mixture is poured onto chopped ice using ether as a washing solvent to transfer the product from the reaction vessel. The resulting tarry mixture is made alkaline with aqueous sodium hydroxide, and the original tar becomes quite fluid. The ethereal solution is separated, washed with water and dried over anhydrous magnesium sulfate. The solution is filtered and warmed to remove the ether. The liquid residue is distilled to yield 5 parts of p-phenylenebis-(iminosulfur oxydifluoride), a colorless liquid boiling at 54° C./1 mm. The identity of the compound, which has the formula

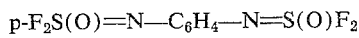

is confirmed by the infrared absorption spectrum and by elemental analysis.

*Anaylsis.*—Calcd. for $C_6H_4N_2S_2O_3F_4$: C, 26.1; H, 1.45; N, 10.2; S, 23.2; F, 27.5. Found: C, 26.49; H, 1.47; N, 10.45; S, 23.44; F, 27.87.

(B)

A glass reaction vessel (capacity, 1000 parts of water), fitted as described in Example IV, except that the dropping funnel is replaced by a gas inlet tube, is charged with 54 parts of p-phenylenediamine and about 310 parts of acetonitrile. Thionyl tetrafluoride (124 parts) is passed into the reaction vessel, with vigorous stirring, over a period of 1 hour. The reaction mixture becomes warm, and a solid product separates which dissolves almost completely as the reaction proceeds. The reaction mixture is poured onto ice, and about 140 parts of ether is added with stirring. Solid sodium sulfate is added to assist in separating the reaction product. The ether layer is separated and washed twice with aqueous hydrochloric acid solution containing sodium sulfate and twice with aqueous 10% sodium sulfate solution. The ether solution is filtered and dried over anhydrous sodium sulfate. Distillation of the ethereal solution yields 92 parts of p-phenylenebis(iminosulfur oxydifluoride), boiling at 52–54° C./1 mm.

EXAMPLE VIII

A glass reaction vessel of the type described in Example VII, Part B, is charged with 13.5 parts of o-phenylenediamine and about 105 parts of ethyl ether. The reaction vessel and contents are cooled in an ice bath, and 31 parts of thionyl tetrafluoride is added over a period of 1 hour. The reaction mixture is poured into ice water, and the ethereal layer is separated. It is washed successively with aqueous hydrochloric acid and water. The ethereal layer is dried over anhydrous magnesium sulfate and filtered. The filtrate is distilled through an efficient fractionating column to yield 21 parts of o-phenylenebis-(iminosulfur oxydifluoride), B.P. 55° C./8 mm. The identity of the product is confirmed by the infrared absorption spectrum.

EXAMPLE IX (A)

A glass reactor of the type described in Example VII, Part B, is charged with 54 parts of m-phenylenediamine and 75–80 parts of acetonitrile, and 31 parts of thionyl tetrafluoride is added to the solution over a period of 0.5 hour. The reaction mixture is poured onto ice; about 150 parts of ether are added together with sodium sulfate to expedite separation of the mixture into two layers. The ethereal layer is separated, and the remaining aqueous layer is extracted with ether. The ethereal solutions are combined and washed successively with aqueous hydrochloric acid and water. The ethereal layer is dried over magnesium sulfate, filtered and then distilled through an efficient fractionating column to yield 13 parts of m-phenylenebis-(iminosulfur oxydifluoride), B.P., 53° C./2 mm. The identity of the compound is confirmed by the infrared absorption spectrum and by elemental analysis.

*Analysis.*—Calc'd for $C_6H_4F_4N_2O_2S_2$: C, 26.1; H, 1.45; N, 10.1. Found: C, 26.73; H, 1.62; N, 10.55.

(B)

A glass reaction vessel, as described in Example VII, Part B, is charged with 54 parts of m-phenylenediamine and 155–160 parts of acetonitrile. The reaction vessel and solution is chilled in ice water, and 31 parts of thionyl tetrafluoride is added to the solution over a period of 1 hour. The reaction mixture is poured into ice water, and concentrated aqueous sodium sulfate solution is added to the mixture to effect a separation of the acetonitrile and aqueous phases. The aqueous phase is removed, washed with ether and chilled in an ice bath. About 150 parts of ether is added to the aqueous solution, and the solution is then made alkaline by adding a 10% solution of sodium hydroxide at such a rate that the temperature does not rise above 25° C. The ethereal layer is separated and dried over anhydrous magnesium sulfate. One-fourth of the dried ethereal solution is saturated with hydrogen chloride gas, and the hydrochloride of m-aminophenyliminosulfur oxydifluoride precipitates as an orange-colored solid. The solid product is separated by filtration and dried in air. It is soluble in water and absolute ethanol and sparingly soluble in ethyl acetate. The compound is insoluble in ether. The identity of the product is confirmed by its infrared absorption spectrum and by analysis.

*Analysis.*—Calc'd for $C_6H_6F_2N_2OS \cdot HCl$: C, 31.5; H, 3.06; N, 12.3. Found: C, 33.60; H, 3.74; N, 13.24.

The remaining portion of the ethereal solution is warmed under reduced pressure, and the residue (8 parts) is distilled in a molecular still at a pressure of approximately 0.01 mm. and at a temperature of 40° C. A pale yellow liquid is obtained which is m-aminophenyliminosulfur oxydifluoride The identity of the compound is confirmed by the nuclear magnetic resonance and infrared absorption spectra.

Examples VI–IX illustrate the compounds of the invention, and their preparation, in which R is an aryl hydrocarbon group. The process is generic for the preparation of this type of compound and can be employed with single ring primary amines or with primary amines containing a plurality of aryl rings which can be separate or fused. The R groups can bear hydrocarbon groups bonded to nuclear aryl carbons. To illustrate, thionyl tetrafluoride can be reacted with 2,5-xylidene to obtain 2,5-xyliminosulfur oxydifluoride, with naphthylamine to obtain naphthyliminosulfur oxydifluoride, with 4-aminobiphenyl to obtain biphenyliminosulfur oxydifluoride, with 4-aminodiphenylmethane to obtain 4-benzylphenyliminosulfur oxydifluoride, with cyclohexylphenylamine to obtain cyclohexylphenyliminosulfur oxydifluoride and with allylphenylamine to obtain allylphenyliminosulfur oxydifluoride.

EXAMPLE X

A reaction vessel similar to the reactor employed in Example VII, Part B, is charged with 25.5 parts of p-aminophenol and about 78 parts of acetonitrile. The reactor and contents are cooled in an ice bath, and 29 parts of thionyl tetrafluoride is added over a period of 1 hour. The reaction mixture is stirred for 4 hours and is then poured onto a mixture of ethyl ether and ice water with vigorous stirring. The mixture is rendered neutral by addition of aqueous sodium bicarbonate solution, and the ethereal layer is separated. The ethereal layer is dried over magnesium sulfate and filtered. The ether is removed under reduced pressure, care being taken to keep the temperature of the residue in the still pot below 25° C. There is obtained a dark oily residue which is soluble in aqueous sodium hydroxide but insoluble in water. The oily product forms a purple color when added to ferric chloride solution thereby showing its phenolic character. The crude oil is distilled at a pressure of about 0.01 mm. of mercury and at a temperature of 45° C. to yield 15 parts of p-hydroxyphenyliminosulfur oxydifluoride. The identity of the product is confirmed by the infrared absorption spectrum and by elemental analysis.

*Analysis.*—Calc'd for $C_6H_5F_2O_2NS$: C, 37.3; H, 2.58; H, 19.2. Found: C, 36.30; H, 2.82; F, 18.32.

EXAMPLE XI

A reaction vessel of the type described in Example VII, Part B, is charged with 69 parts of m-nitroaniline and about 140 parts of ethyl ether. The reactor and contents are cooled in ice water, and 62 parts of thionyl tetrafluoride is added over a period of about 1 hour. The reaction mixture is stirred for 5 hours as the temperature is allowed to rise to about 25° C. and it is then poured onto ice water. The heterogeneous mixture is filtered to remove a small amount of precipitated material, and the ethereal layer is separated. This layer is washed with aqueous dilute hydrochloric acid and then with water. The ethereal layer is dried over anhydrous magnesium sulfate, filtered and it is then distilled through an efficient fractionating column. There is obtained 7 parts of m-nitrophenyliminosulfur oxydifluoride, a liquid which boils at 71° C./1.5 mm. pressure. The identity of the product is confirmed by the infrared absorption spectrum and by elemental analysis.

*Analysis.*—Calc'd $C_6H_4F_2N_2O_3S$: C, 32.4; H, 1.8; F, 17.1. Found: C, 33.12; H, 2.01; F, 16.54.

Examples X and XI illustrate the compounds of the invention in which R is an aryl group bearing substituents, other than hydrocarbon, which are unreactive or inert to thionyl tetrafluoride. The process is generic for the preparation of this class of compounds and can be employed with monocyclic or polycyclic aryl compounds bearing substituents which are halogen, amino, loweralkylamino, carboxy, hydroxy or nitro. To illustrate, thionyl tetrafluoride can be reacted with 2,4-dichloroaniline to obtain 2,4-dichlorophenyliminosulfur oxydifluoride, with trifluoroaniline to obtain trifluorophenyliminosulfur oxydifluoride, with p-(p'-bromobenzyl)aniline to obtain p-(p'-bromobenzyl)phenyliminosulfur oxydifluoride, with p-ethylaminoaniline to obtain p-ethylaminophenyliminosulfur oxydifluoride, with p-(p'-dimethylaminophenyl)aniline to obtain p-(p'-dimethylaminophenyl)phenyliminosulfur oxydifluoride, with m-aminobenzoic acid to obtain m-carboxyphenyliminosulfur oxydifluoride, with 2,4-dinitroaniline to obtain 2,4-dinitrophenyliminosulfur oxydifluoride, and with triaminobenzene to obtain aminophenylbis(iminosulfur oxydifluoride).

The example which follows illustrates the process of the invention employing a salt of a primary amine as the reactant.

EXAMPLE XII

A glass reaction vessel of the type described in Example VII, Part B, is charged with 23 parts of aniline and about 145 parts of diethyl ether. Hydrogen chloride gas is then passed into the solution until all of the aniline is converted to insoluble aniline hydrochloride. The suspension of aniline hydrochloride in ether is stirred vigorously and 31 parts of thionyl tetrafluoride is passed into the reaction mixture. The temperature of the mixture is maintained at −10° to 0° C. by the refluxing of the thionyl tetrafluoride for a period of 24 hours. The reaction mixture is poured onto ice and the ethereal solution is separated. It is washed with cold 10% hydrochloric acid and with ice water. The ethereal solution is dried, filtered and then distilled through an efficient fractionating column. There is obtained 8 parts of phenyliminosulfur oxydifluoride, B.P. 68° C./3 mm.; $n_D^{25}$, 1.4750.

Aniline hydrofluoride ($C_6H_5NH_2 \cdot HF$) reacts with thionyl tetrafluoride under the conditions described in Example XII to yield phenyliminosulfur oxydifluoride. In like manner, thionyl tetrafluoride reacts with ethylamine hydrochloride to yield ethyliminosulfur oxydifluoride, with butylammonium acetate to yield butyliminosulfur oxydifluoride and with cyclohexylammonium propionate to yield cyclohexyliminosulfur oxydifluoride.

Example XII illustrates the process of the invention employing a salt of the primary amine as the reactant. The process is generic for the preparation of iminosulfur oxydifluorides. The salt is an acid addition compound between the primary amine and the acid. The salt serves solely as a carrier of the amine and is a convenient means of introducing the amine into the reaction zone. The acid portion of the salt does not enter into or interfere with the reaction. For practical and economical reasons the simplest acid addition salts are employed, e.g., salts of inorganic halogen acids such as hydrochloric acid, hydrobromic acid, salts of phosphoric and sulfuric acids, salts of readily available organic acids, such as acetic, benzoic, trichloroacetic and the like.

The compounds of the invention are useful as solvents for highly fluorinated polymers, e.g., the fluorinated olefin polymers. Solutions of such polymers, e.g., poly(tetrafluoroethylene), poly(chlorotrifluoroethylene), and the like in iminosulfur oxydifluorides are useful in making cellulosic compositions water-repellant. To illustrate, an approximately 10% by weight solution of a low molecular weight, low melting tetrafluoroethylene polymer (melting range 83–150° C.) is prepared by warming the polymer in methyliminosulfur oxydifluoride until the polymer dissolves. Strips of filter paper are treated with this solution, either by immersion in the liquid or by pouring the liquid on the paper. The treated paper, optionally washed with acetone, is dried in air. The treated paper is not wet by drops of water whereas untreated paper is immediately and completely wetted by water. The treated paper does not support combustion whereas the untreated paper burns readily. Equally good results are obtained by employing approximately 10% solutions of low-melting tetrafluoroethylene polymer in iminosulfur oxydifluoride, 5-carboxy-n-pentyliminosulfur oxydifluoride and phenyliminosulfur oxydifluoride.

High boiling iminosulfur oxydifluorides are generically useful as modifiers for polymeric products to improve the flexibility of films obtained from the polymers. To illustrate, films of polystyrene containing about 10% of m-nitrophenyliminosulfur oxydifluoride show substantially better resistance to cracking on flexing than films from unmodified polystyrene.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $X-N=S(O)F_2$, wherein X contains up to 18 carbons and is a member of the group consisting of hydrogen, hydrocarbon, halohydrocarbon in which all halogens are of atomic number 9–35, and substituted hydrocarbon having as its sole substituents 1–2 members of the class consisting of $-N=S(O)F_2$, carboxyl, nitro, amino, $-NH$(loweralkyl), $-N$(loweralkyl)$_2$, and hydroxyl, each amino, $-NH$(loweralkyl), $-N$(loweralkyl)$_2$ and hydroxyl group being bonded to a nuclear carbon of an aromatic ring.

2. A compound of claim 1 wherein X is hydrocarbon.
3. A compound of claim 1 wherein X is aliphatically saturated hydrocarbon.
4. Methyliminosulfur oxydifluoride.
5. Ethylenebis(iminosulfur oxydifluoride).
6. Phenyliminosulfur oxydifluoride.
7. m-Aminophenyliminosulfur oxydifluoride.
8. m-Nitrophenyliminosulfur oxydifluoride.
9. Iminosulfur oxydifluoride.

10. A process of preparing a compound of the formula
R—N=S(O)F$_2$, wherein R contains 1–18 carbons and is a member of the group consisting of hydrocarbon, halohydrocarbon in which all halogens are of atomic number 9–35, and substituted hydrocarbon having as its sole substitutents 1–2 members of the class consisting —N=S(O)F$_2$, carboxyl, nitro, amino, —NH(loweralkyl), —N(loweralkyl)$_2$, and hydroxyl, each amino, —NH(loweralkyl), —N(loweralkyl)$_2$, and hydroxyl group being bonded to a nuclear carbon of an aromatic ring, which comprises contacting thionyl tetrafluoride with an amine of the formula R'NH$_2$ at a temperature between about —80° C. and about 250° C. under substantially anhydrous conditions, R' being an organic group of 1–18 carbons selected from the group consisting of hydrocarbon, halohydrocarbon in which all halogens are of atomic number 9–35, and substituted hydrocarbon having as its sole substituents 1–2 members of the class consisting of carboxyl, nitro, amino, —NH(loweralkyl), —N(loweralkyl)$_2$, and hydroxyl, each —NH(loweralkyl), —N(loweralkyl)$_2$, and hydroxyl group being bonded to a nuclear carbon of an aromatic ring.

11. The process of claim 10 wherein the temperature is between about —20° C. and 150° C.

12. The process of claim 10 wherein said amine is used in the form of one of its acid addition salts.

13. A process of preparing iminosulfur oxydifluoride comprising reacting thionyl tetrafluoride with ammonia at a temperature below about —30° C. in the presence of a neutral oxygenated liquid reaction medium in which the oxygen is present as an oxy linkage.

14. The process of claim 13 wherein the temperature is below —50° C.

15. The process of claim 13 wherein the ammonia is used in the form of one of its acid addition salts.

References Cited

UNITED STATES PATENTS 2,862,029  11/1958  Smith _____ 260—543

OTHER REFERENCES

Glemser: "Angewandte Chemie, International Edition," vol. 2, No. 9, pp. 530–540, 1963.

Glemser et al.: "Zeitschrift fur, Anorganische and Allgemeine Chemie," vol. 284, pp. 97–100, 1956.

EDWARD J. MEROS, *Primary Examiner.*